(12) United States Patent
Laney

(10) Patent No.: US 6,568,417 B2
(45) Date of Patent: May 27, 2003

(54) THROTTLE VALVE ASSEMBLY

(75) Inventor: Robert A. Laney, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/836,312

(22) Filed: Apr. 17, 2001

(65) Prior Publication Data

US 2002/0148512 A1 Oct. 17, 2002

(51) Int. Cl.[7] .............................................. F16K 31/53
(52) U.S. Cl. ........................ 137/15.25; 137/601.11; 137/601.14; 137/601.15; 137/601.17
(58) Field of Search ..................... 137/601.11, 601.14, 137/601.15, 601.17, 15.25; 251/248, 250.5, 305, 308

(56) References Cited

U.S. PATENT DOCUMENTS

| 2,024,823 | A | * | 12/1935 | Jones ....................... 251/250.5 |
| 2,375,432 | A | * | 5/1945 | Miller et al. .............. 251/250.5 |
| 3,771,559 | A | * | 11/1973 | Alley ...................... 137/601.11 |
| 4,275,762 | A | * | 6/1981 | Field ....................... 137/601.11 |
| 4,685,156 | A | * | 8/1987 | Brabazon .................... 137/597 |
| 5,280,983 | A | * | 1/1994 | Maydan et al. ........... 294/119.1 |
| 5,647,399 | A | * | 7/1997 | Andersen .................. 251/250.5 |
| 5,944,506 | A | * | 8/1999 | Kamal et al. ........... 137/601.11 |
| 6,119,652 | A | * | 9/2000 | Waples et al. ............... 123/337 |

* cited by examiner

Primary Examiner—Stephen M. Hepperle
(74) Attorney, Agent, or Firm—Schwegman, Lundberg, Woessner & Kluth, P.A.

(57) ABSTRACT

A throttle valve assembly for a deposition chamber or the like is disclosed. The throttle valve assembly comprises a shaft including a first portion and second portion. At least one throttle vane or plate is coupled to the first portion of the shaft and a valve gear is coupled to the second portion of the shaft. A positioning element is provided to couple the valve gear to the shaft in only one rotational orientation.

27 Claims, 4 Drawing Sheets

THROTTLE VALVE ASSEMBLY

FIELD OF THE INVENTION

The present invention relates generally to controlling gas flow or gas pressure in a device, and more particularly to a throttle valve assembly for a deposition chamber or the like.

BACKGROUND INFORMATION

In the manufacturing of semiconductor devices and integrated circuits, multiple layers of different types of materials, such as conductive, semiconductive, and insulation type materials, are deposited or formed on a substrate, semiconductor die or wafer. Selected portions of the different layers may be removed in predetermined patterns by etching, photolithography or other material removal techniques, or ions or charged particles may be implanted in selected areas to form different semiconductor regions and components of a semiconductor device or integrated circuit. In a high volume, high pressure deposition process (HDP) the pressure or flow of gases in a deposition chamber must be precisely regulated or very accurately controlled according to predetermined manufacturing parameters for a particular device or integrated circuit to provide the desired semiconductor structure.

In a high speed operation, the changes in gas flow or pressure must sometimes be made very rapidly as well as with precision. Rapid gas pressure adjustments on the order of one or two nanoseconds may sometimes be required by a particular manufacturing process. The amount of gas pressure within a deposition chamber is typically controlled by a vane or set of vanes disposed within the deposition chamber that can be positioned to completely open, partially open or completely block the flow of gases through the deposition chamber. One mechanical arrangement currently utilized to adjust the positioning of the vanes includes a cylindrical shaft attached at one end to one of the vanes and at the other end, the shaft is inserted into a gear that may be driven by a motor or other means or the gear may drive another gear for positioning another vane of the deposition system. The gear is held in rotational and longitudinal position on the shaft by a set screw. Because the adjustments to the vane or vanes must sometimes be made very rapidly, precisely and under high pressure, the gear is prone to rotational slipping on the cylindrical shaft resulting in the gear becoming offset or misaligned from its proper rotational position on the shaft and resulting in inaccurate positioning of the vanes during a manufacturing process. The misalignment of the gear relative to the shaft and inaccurate positioning of the vanes will cause defective products and manufacturing downtime while the gear and shaft are being realigned. In realigning the gear and shaft, care must be taken to precisely position the gear on the shaft for accurate positioning of the vanes. Misplacement of the drive gear relative to the shaft can also adversely affect the manufacturing process.

Accordingly, for the reason stated above, and for other reasons that will become apparent upon reading and understanding the present specification, there is a need for a throttle valve assembly that is not prone to slippage under extreme operating conditions and that can be precisely and easily assembled for proper alignment of the vanes and accurate control of the gas flow within a deposition chamber or other device.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
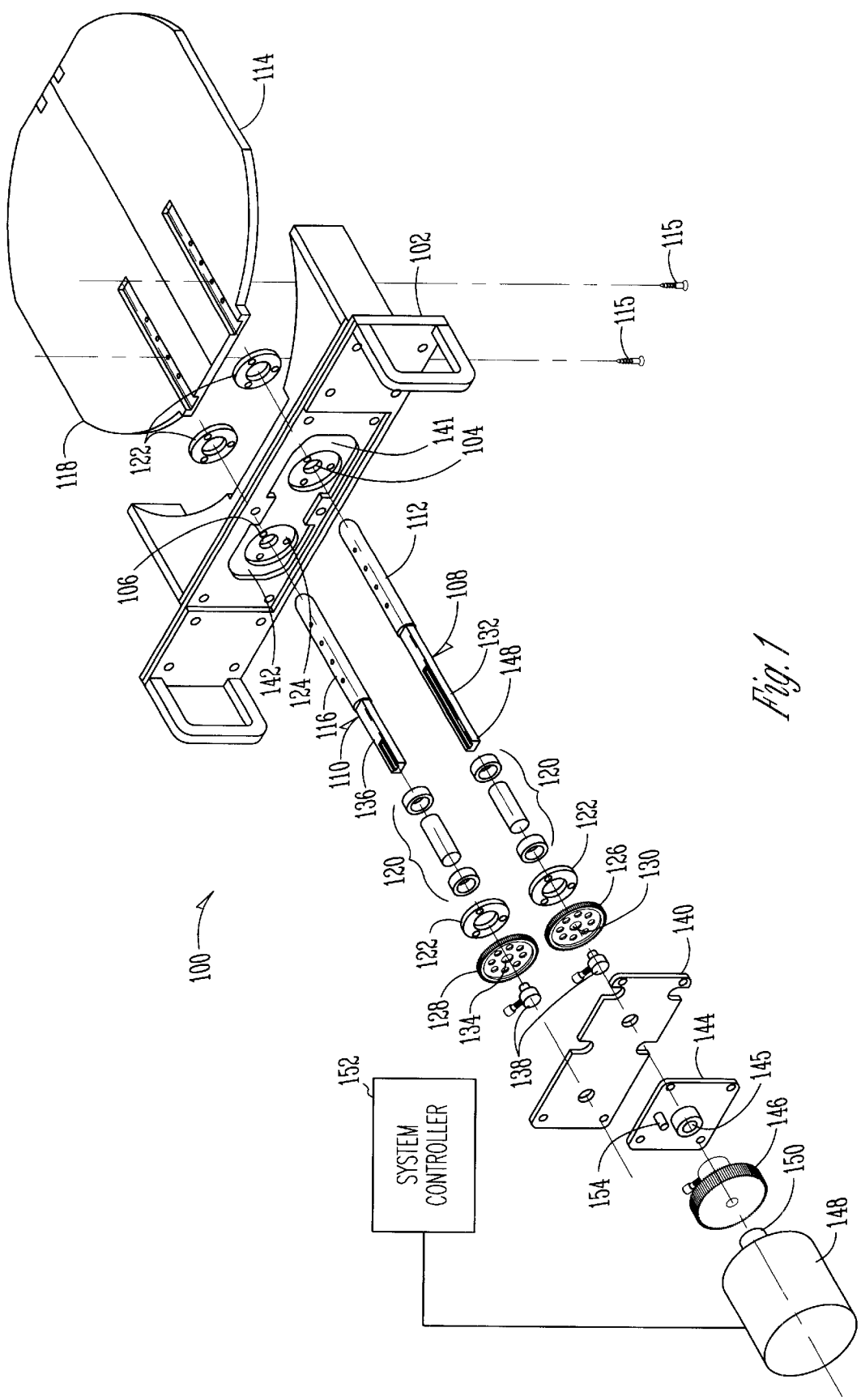
FIG. 1 is an exploded perspective view of a throttle valve assembly in accordance with the present invention.

FIG. 1 is an exploded perspective view of a throttle valve assembly 100 for a deposition chamber (not shown in FIG. 1) in accordance with the present invention. The throttle valve assembly 100 includes a gear plate 102. The gear plate 102 shown in FIG. 1 includes a first opening 104 and a second opening 106 formed through the gear plate 102 through which a main or first actuation shaft 108 and a second actuation shaft 110 are respectively inserted. The main actuation shaft 108 includes a first portion 112 that is attached to a first throttle vane or plate 114 by fasteners 115 and the second actuation shaft 110 includes a first portion 116 that is attached to a second throttle vane or plate 118 by fasteners 115. A bearing assembly 120 is inserted on each actuation shaft 108 and 110 for rotation of the shafts 108 and 110 within the gear plate openings 104 and 106. The bearing assemblies are held in place by retainer plates 122 attached to both sides of the gear plate 102. The gear plate 102 may have recesses 124 formed therein into which the retainer plates 122 reside when the throttle valve assembly 100 is assembled.

The throttle valve assembly 100 also includes a first valve gear 126 and a second valve gear 128. The first valve gear 126 has a hub 130 through which a second portion 132 of the main actuation shaft 108 is inserted, and the second valve gear 128 has a hub 134 through which a second portion 136 of the second actuation shaft 110 is inserted. A valve gear retainer 138 may be inserted onto each shaft 108 and 110 to retain the first and second valve gears 126 and 128 respectively on the main and second shafts 108 and 110. During assembly, the teeth (not shown in detail in FIG. 1) of the first valve gear 126 will be meshed with the teeth (also not shown in detail in FIG. 1) of the second valve gear 128. Accordingly, when the first valve gear 126 is rotated in one direction, the second valve gear 128 will rotate in the opposite direction and the actuation shafts 108 and 110 will adjust the positions of the first and second throttle vanes 114 and 118. A cover plate 140 is attached to the gear plate 102 to cover the first and second valve gears 126 and 128 and to form a housing 141 for the valve gears 126 and 128 with a second, outer recess 142 formed in the gear plate 102. A spindle plate 144 is attached to the gear plate 102 over the cover plate 140. The spindle plate 144 has an opening 145 formed therein through which the main actuation shaft 108 extends. A shaft drive gear 146 is attached proximally to an end 148 of the second portion 132 of the main actuation shaft 108. The shaft drive gear 146 is coupled to a stepper motor 148. The shaft drive gear 146 may be coupled to the stepper motor 148 by a motor drive gear 150. The stepper motor 148 is electrically connected to a system controller 152. The system controller 152 controls operation of the stepper motor 148 to position the vanes 114 and 118 at predetermined locations or positions to control the gas flow or pressure within a deposition chamber (not shown in FIG. 1) according to a recipe or process for manufacturing a particular semiconductor device or integrated circuit.

While the throttle valve assembly 100 of the present invention has been described as having two throttle vanes 114 and 118, it should be noted that the throttle valve assemble 100 could, as well, be designed to include only a single throttle vane. A single throttle vane would require a much more robust actuation mechanism to withstand the high stresses caused by the high gas pressures and rapid adjustments that the single vane could be subjected to during some manufacturing operations. With two throttle vanes 114 and 118 the stresses and fatigue on the components of the throttle valve assembly 100 are divided and repairs and system downtime caused by high stresses and fatigue are reduced.

Figure 2:
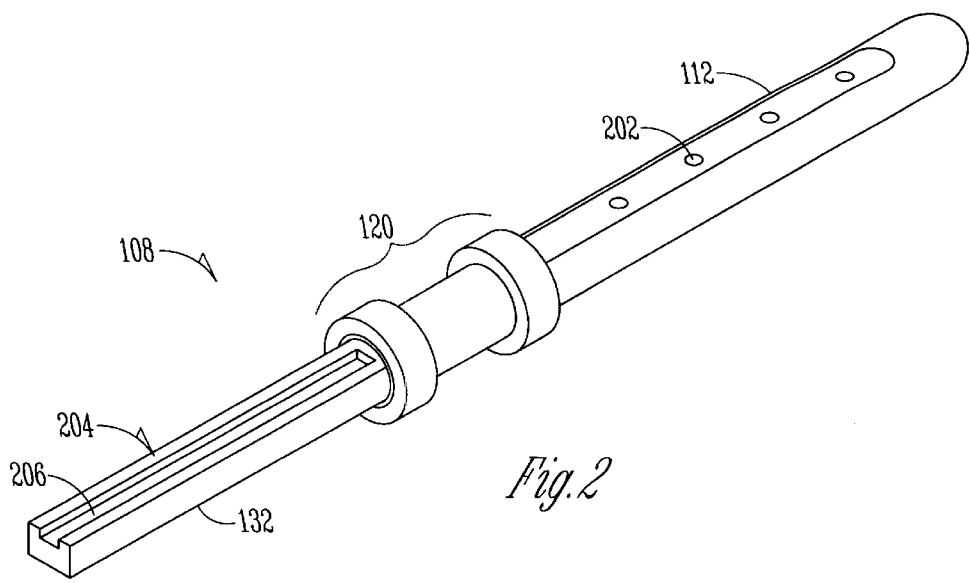
FIG. 2 is a detailed perspective view of a main shaft for use with the throttle valve assembly of FIG. 1.
Figure 3:
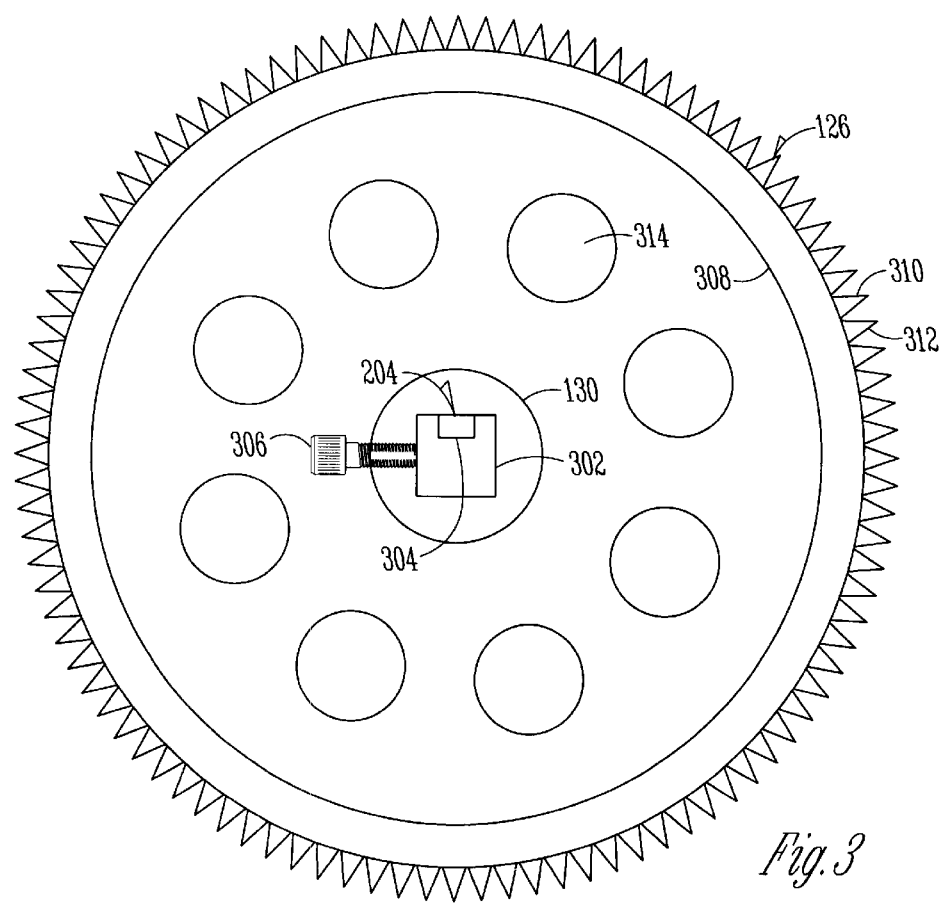
FIG. 3 is a detailed top elevation view of a throttle valve shaft gear for use with the throttle valve assembly of FIG. 1.

A detailed perspective view of the first or main actuation shaft 108 is shown in FIG. 2. The first portion 112 of the substantially cylindrical main actuation shaft 108 is preferably flattened to provide a more stable and robust attachment to the first vane 114. A plurality of holes 202 are formed by drilling and may be tapped to receive the fasteners 115 (FIG. 1) or bolts to attach the first vane 114 to the main shaft 108. In accordance with the present invention, the second portion 132 of the main shaft 108 has a non-cylindrical cross-section. Referring also to FIG. 3, the hub 130 of the first valve gear 126 has an aperture 302 formed therein with a cross-section to matingly receive the second portion 132 of the main shaft 108 to retain the first valve gear 126 in a fixed rotational position relative to a circumference or perimeter of the main actuation shaft 108 when the shaft 108 is rotated to adjust the positioning of the throttle vanes 114 and 118. The cross-section of the second portion 132 of the main shaft 108 and the aperture 302 of the hub 130 are shown in FIGS. 2 and 3 to be substantially square; however, any non-circular cross-section that prevents the first valve gear 126 from slipping rotationally on the main shaft 108 may be used. For example, the cross-sections could be a triangle, rectangle, or other polygon having a cross-section including at least three angles.

In accordance with the present invention, the throttle valve assembly 100 includes a positioning element 204 (FIGS. 2 and 3) to cause the first valve gear 126 to fit onto the main actuation shaft 108 in only one predetermined position or rotational orientation so that the first valve gear 126 is always properly aligned with the first throttle vane 114. The positioning element 204 may include a groove 206 or key formed in the second portion 132 of the main actuation shaft 108 at a predetermined circumferential location to coordinate with the flattened first portion 112 of the first actuation shaft 108 for proper orientation or alignment of the throttle vanes 114 and 118. In one embodiment, positioning element 204 also includes a land 304 or tab formed in the aperture 302 of the first valve gear 126 (FIG. 3) that fits into the groove 206 when the main actuation shaft 108 is inserted into the aperture 302 in the hub 130 of the first valve gear 126 so that the first valve gear 126 can fit onto the main actuation shaft 108 only one way. A set screw 306 through the hub 130 of the first valve gear 126 is provided to be tightened to secure the first valve gear 126 on the main actuation shaft 108 and to prevent the first valve gear 126 from moving longitudinally along the shaft 108. In another embodiment, the set screw 306 may be used in place of the tab 304 to both fit into the groove 206 so that the first valve gear 126 can only fit onto the main shaft 108 in only one rotational orientation for proper alignment with the throttle vanes 114 and 118 and for tightening to secure the first valve gear 126 in longitudinal position on the main actuation shaft 108.

The second actuation shaft 110 preferably has the same structure as the main actuation shaft 108 shown in FIG. 2. Accordingly, the second actuation shaft 110 includes a flattened first portion 116 (FIG. 1) for a more stable, robust attachment between the second actuation shaft 110 and the second throttle vane 118. The second portion 136 of the second actuation shaft 110 has a non-cylindrical cross-section and a groove 206 or key formed in the second portion 136 to form a part of a positioning element 204. Additionally the hub 134 of the second valve gear 128 has a structure similar to the hub 130 of the first valve gear 126 shown in FIG. 3. Accordingly, the second valve gear 128 also may include a tab 304 in one embodiment or set screw 306 in another embodiment to fit into the groove 206 in the second portion 136 of the shaft 110 so that the second valve gear 128 can only fit onto the second actuation shaft 110 in one position or rotational orientation; this insures proper alignment between the second valve gear 128 and the second throttle vane 118.

The second valve gear 128 may have the same structure as the first valve gear 126. Referring again to FIG. 3, the first valve gear 126 and the second valve gear 128, shown only in FIG. 1, may be formed in two portions, an inner portion 308 and an outer, circumferential portion 310 into which gear teeth 312 are formed. The inner portion 308 may be formed from a metal, such as aluminum or another strong but light weight metal or alloy, and the outer, circumferential portion 310 may be made from a plastic material, such as a durable engineering plastic. Holes 314 may be formed in the inner portion 308 to further reduce weight.

Figure 5:
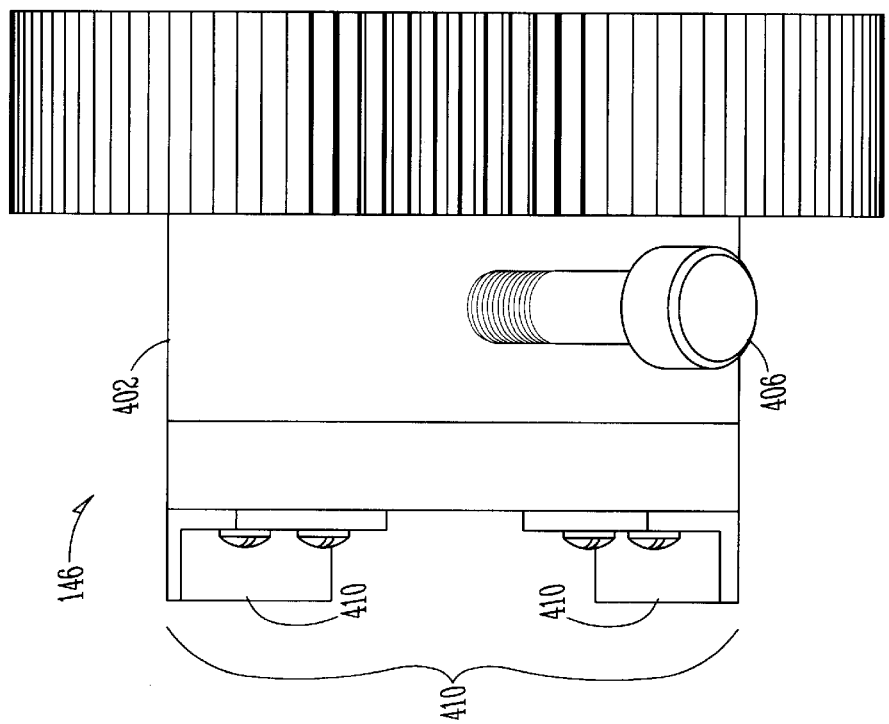
FIG. 5 is a detailed side elevation view of the drive gear of FIG. 3.
Figure 4:
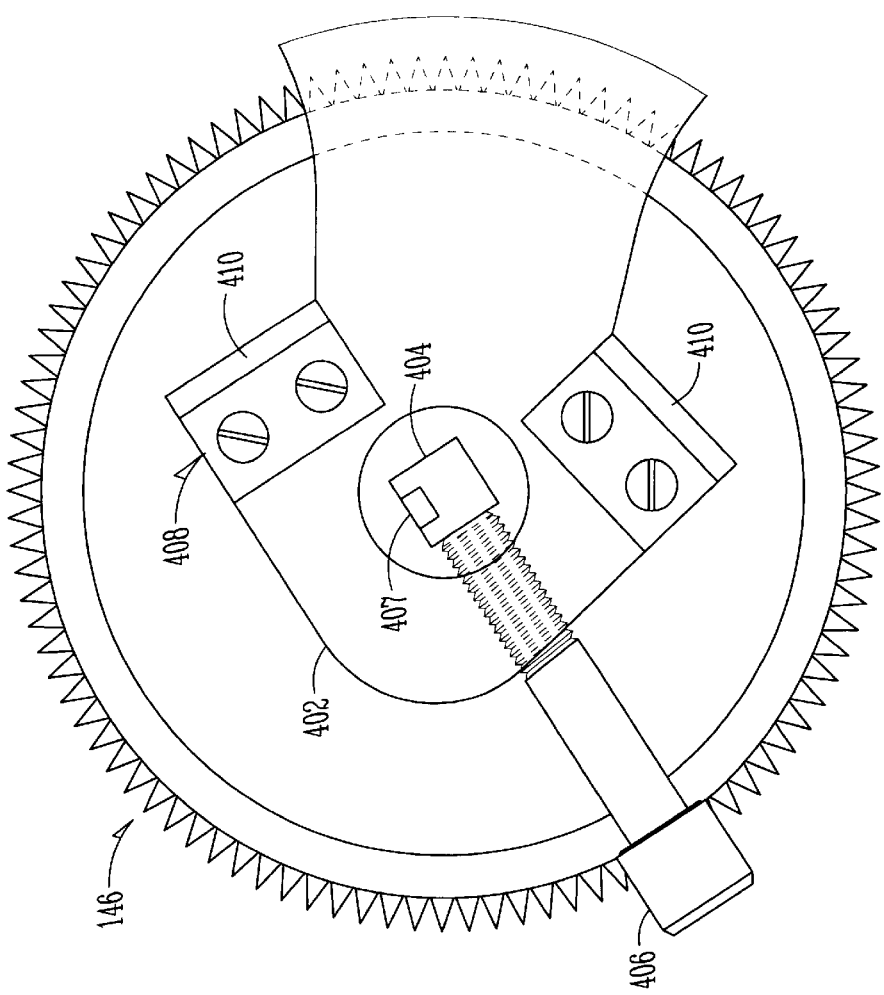
FIG. 4 is a detailed top elevation view of a drive gear for use with the throttle valve assembly of FIG. 1.

FIG. 4 is a detailed top elevation view of the shaft drive gear 146 and FIG. 5 is a detailed side elevation view of the shaft drive gear 146. The shaft drive gear 146 includes a hub 402 with an aperture 404 formed therein that has a non-circular cross-section to matingly receive the non-cylindrical cross-section of the second portion 132 of the main actuation shaft 108. As discussed above, the non-circular cross-section may be any shape that prevents the shaft drive gear 146 from slipping rotationally on the main actuation shaft 108 during rapid adjustments of the throttle vanes 114 and 118 during a manufacturing operation. A set screw 406 extending into the aperture 404 of the hub 402 is provided to tighten onto the main actuation shaft 108 to hold the shaft drive gear 146 in place along the length of the main actuation shaft 108. In one embodiment the set screw 406 may also be used to fit into the groove 206 formed in the second portion 132 of the main actuation shaft 108 so that the shaft drive gear 146 can fit on the main actuation shaft 108 in only one rotational orientation for proper alignment with the first and second valve gears 126 and 128 and with the first and second throttle vanes 114 and 118. In another embodiment a tab 407 may be formed in the aperture 404 of the shaft drive gear 146 to engage the groove 206 in the main actuation shaft 108 so that the drive gear 146 can fit on the main actuation shaft 108 in only one position for proper alignment of the shaft drive gear 146 with the valve gears 126 and 128 and with the throttle vanes 114 and 118.

Figure 6:
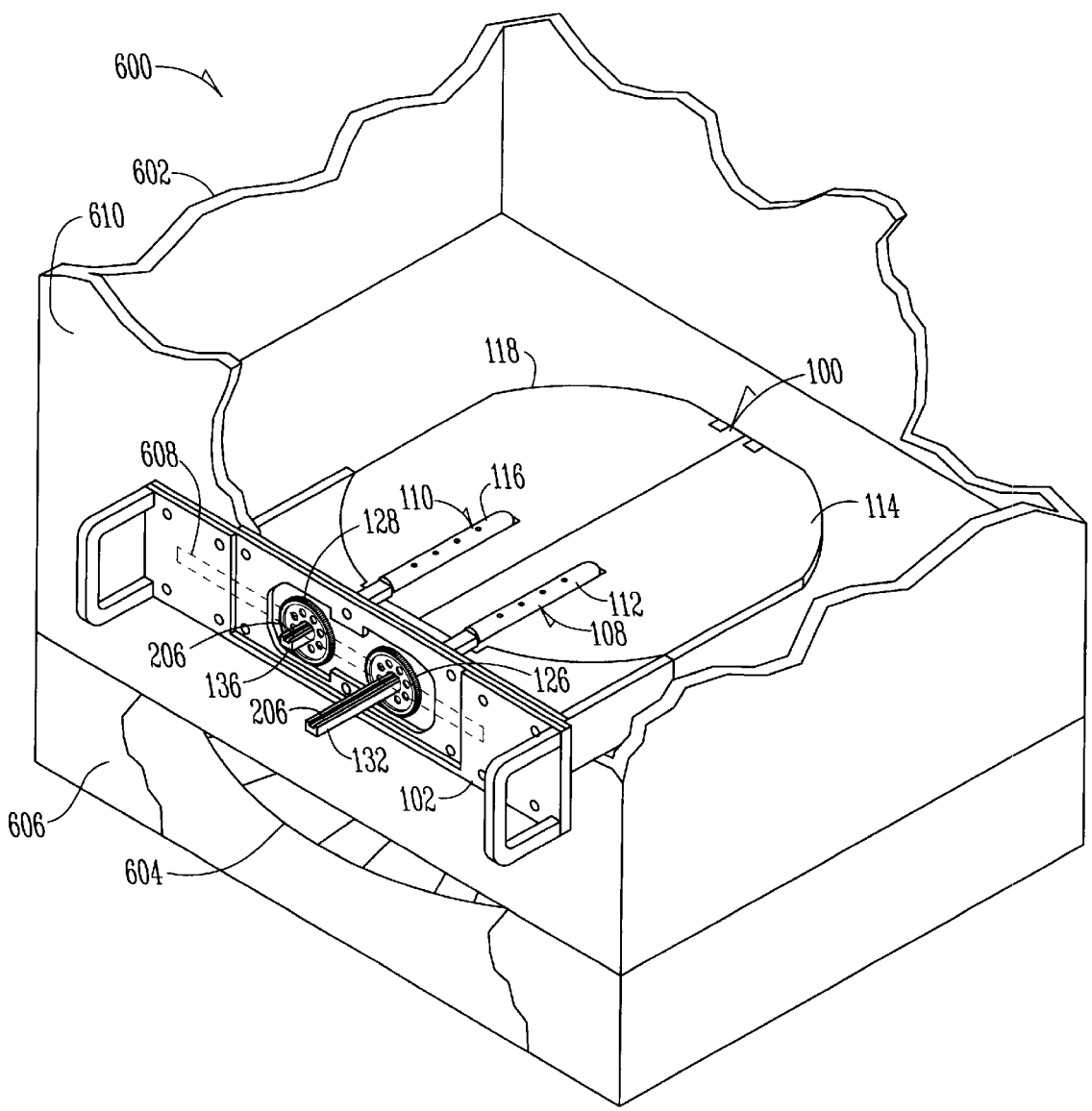
FIG. 6 is a perspective cut-away view of a portion of a deposition system in accordance with the present invention.

FIG. 6 is a perspective cut-away view of a portion of a deposition system 600 that may utilize the throttle valve assembly 100 of the present invention. The deposition system 600 includes a deposition chamber 602. The deposition chamber 602 is disposed over a turbo fan 604 contained within a housing 606. The turbo fan 604 causes gas flow through the deposition chamber 602 for depositing material diffused in the carrier gas on an integrated circuit (not shown) or exposing the integrated circuit to an etchant diffused in the carrier gas or to other chemicals as part of a photolithographic or manufacturing process. The throttle vanes 114 and 118 are inserted through a narrow, elongated opening 608 formed in a lower portion of one sidewall 610 of the deposition chamber 602 proximate to the turbo fan 604. The gear plate 102 is attached to the sidewall 610 of the deposition chamber 602 to retain the throttle vanes 114 and 118 in position within the deposition chamber 602 to control the rate of gas flow through the deposition chamber 602 according to a manufacturing process for a particular integrated circuit or semiconductor device.

Referring also back to FIGS. 4 and 5, the throttle valve assembly 100 may also include a limiter assembly 408 to restrict rotation of the main actuation shaft 108 and the throttle vanes 114 and 118 between predetermined positions, such as between the throttle vanes 114 and 118 being in a filly open position for maximum gas flow within or through the deposition chamber 602 (FIG. 6) and a fully closed position for minimal or no gas flow through the deposition chamber 602. The limiter assembly 408 may include a pair of limit tabs 410 or flags attached to the hub 402 of the shaft drive gear 146. A limit stop 154 (FIG. 1) is formed on the spindle plate 144 to engage the limit tabs 410 to prevent the throttle vanes from rotating beyond predetermined limits or positions.

While the present invention has been described with respect to a deposition chamber for manufacturing semiconductor devices or integrated circuits, it should be noted that the throttle valve assembly 100 of the present invention may be adapted and used in any device or apparatus to control the flow of gas or control gas pressure in the device.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A throttle valve assembly, comprising:
    a first shaft including a first portion and a second portion;
    a first throttle vane coupled to the first portion of the first shaft, wherein the first portion of the first shaft has an elongated, flattened side to attach to the first throttle vane in only one rotational orientation;
    a second shaft including a first portion and a second portion;
    a second throttle vane coupled to the first portion of the second shaft, wherein the first portion of the second shaft has an elongated, flattened side to attach to the second throttle vane in only one rotational orientation;
    a first valve gear coupled to the second portion of the first shaft;
    a second valve gear coupled to the second portion of the second shaft and driven by the first valve gear; and
    a positioning element to couple the first valve gear to the first shaft in only one rotational orientation, wherein the second portion of the first shaft has a selected cross-section to form at least a part of the positioning element and wherein the elongated, flattened side of the first portion of the first shaft and the cross-section of the second portion of the first shaft are oriented relative to each other to cause the first valve gear to be aligned with the first throttle vane.

2. The throttle valve assembly of claim 1, wherein the positioning element comprises one of a key or a groove formed in the second portion of the first shaft at a predetermined location.

3. The throttle assembly of claim 2, wherein the positioning element comprises a tab formed in an aperture of a hub of the first valve gear to engage the one of the key or the groove.

4. The throttle assembly of claim 1, wherein the second portion of the first shaft comprises a non-cylindrical cross-section, and wherein the first valve gear comprises a hub with an aperture having a cross-section to matingly receive the second portion of the first shaft to retain the first valve gear in a fixed rotational position relative to a perimeter of the first shaft.

5. The throttle assembly of claim 4, wherein the cross-section comprises at least three angles.

6. The throttle assembly of claim 4, wherein the cross-section is one of a square, a rectangle or a polygon.

7. The throttle assembly of claim 1, further comprising a limiter assembly to restrict rotation of the first shaft between a first predetermined position and a second predetermined position.

8. The throttle assembly of claim 1, further comprising a stepper motor coupleable to the first shaft to position the first throttle vane at predetermined positions to control gas flow within a device.

9. The throttle assembly of claim 1, further comprising:
    a stepper motor; and
    a drive gear coupled to the stepper motor and to the first shaft to position the first throttle vane at predetermined locations to control gas flow within a device.

10. The throttle assembly of claim 9, further comprising limit flags attached to the drive gear to limit rotation of the first shaft between a first predetermined position and a second predetermined position.

11. The throttle assembly of claim 9, wherein the second portion of the first shaft comprises a non-cylindrical cross-section, and wherein the drive gear comprises an aperture having a cross-section to matingly receive the second portion of the first shaft to retain the drive gear in a predetermined position relative to the first shaft.

12. A deposition system for making a semiconductor device, comprising:
    a deposition chamber; and
    a throttle valve assembly attached to the deposition chamber to control a rate of gas flow within the deposition chamber to deposit material in the gas on a semiconductor device or to expose the semiconductor device to the gas, the throttle valve assembly comprising:
        a shaft including a first portion and a second portion,
        a throttle vane coupled to the first portion of the shaft and disposed relative to the deposition chamber to control the rate of gas flow within the deposition chamber, wherein the first portion of the shaft has an elongated, flattened side to attach to the throttle vane in only one rotational orientation,
        a valve gear coupled to the second portion of the shaft, and
        a positioning element to couple the valve gear to the shaft in only one rotational orientation, wherein the second portion of the shaft has a selected cross-section to form at least a part of the positioning element and wherein the elongated, flattened side of the first portion and the second portion of the shaft are oriented relative to each other to cause the valve gear to be aligned with the throttle vane.

13. The deposition system of claim 12, wherein the positioning element comprises one of a key or a groove formed on the second portion of the shaft at a predetermined location.

14. The deposition system of claim 13, wherein the positioning element comprises a tab formed in an aperture of a hub of the valve gear to engage the one of the key or the groove.

15. The deposition system of claim 12, wherein the second portion of the shaft comprises a non-cylindrical cross-section, and wherein the valve gear comprises a hub with an aperture having a cross-section to matingly receive the second portion of the shaft to retain the valve gear in a fixed rotational position relative to the shaft.

16. The deposition system of claim 12, further comprising a limiter assembly to restrict rotation of the shaft between a first predetermined position and a second predetermined position.

17. The deposition system of claim 12, further comprising:
 a stepper motor; and
 a drive gear coupled to the stepper motor and to the shaft to position the throttle vane at predetermined positions to control the rate of gas flow within the deposition chamber.

18. The deposition system of claim 17, further comprising a pair of limit flags attached to the drive gear to limit rotation of the shaft between a first predetermined position and a second predetermined position.

19. The deposition system of claim 17, wherein the second portion of the shaft comprises a non-cylindrical cross-section, and wherein the drive gear comprises an aperture having a cross-section to matingly receive the second portion of the shaft to retain the drive gear in a predetermined position relative to the shaft.

20. A method of controlling gas flow in a system for making a semiconductor device, comprising:
 coupling a throttle vane to an elongated, flattened side of a first portion of a shaft;
 coupling a valve gear to a second portion of the shaft, wherein the elongated, flattened side of the first portion and the second portion of the shaft are shaped to cause a predetermined rotational orientation of the valve gear relative to the throttle vane;
 retaining the valve gear in a fixed rotational position relative to a circumference of the shaft; and
 disposing the throttle vane relative to a deposition chamber to control a rate of gas flow within the deposition chamber to deposit material in the gas on a semiconductor device or to expose the semiconductor device to the gas.

21. The method of claim 20, further comprising aligning the valve gear in only one rotational orientation relative to a circumference of the shaft when coupling the valve gear to the second portion of the shaft.

22. The method of claim 21, wherein aligning the valve gear in only one rotational orientation comprises forming one of a groove or a key in the second portion of the shaft.

23. The method of claim 20, wherein retaining the valve gear in a fixed rotational position comprises forming the second portion of the shaft to include a non-cylindrical cross-section, and further comprising forming an aperture in a hub of the valve gear with a cross-section to matingly receive the second portion of the shaft.

24. The method of claim 20, further comprising forming a limiter assembly to restrict rotation of the shaft between a first predetermined position and a second predetermined position to control the rate of gas flow within the deposition chamber.

25. The method of claim 20, further comprising coupling a stepper motor to the shaft to position the throttle vane at predetermined positions to control the rate of gas flow within the deposition chamber.

26. The method of claim 25, further comprising coupling a drive gear between the stepper motor and the shaft.

27. The method of claim 26, further comprising attaching limit flags to the drive gear to limit rotation of the throttle vane between a first predetermined position and a second predetermined position.

* * * * *